No. 659,593.  
C. W. RICHARDS.  
TOOTH BRUSH.  
(Application filed Apr. 5, 1900.)
Patented Oct. 9, 1900.
(No Model.)
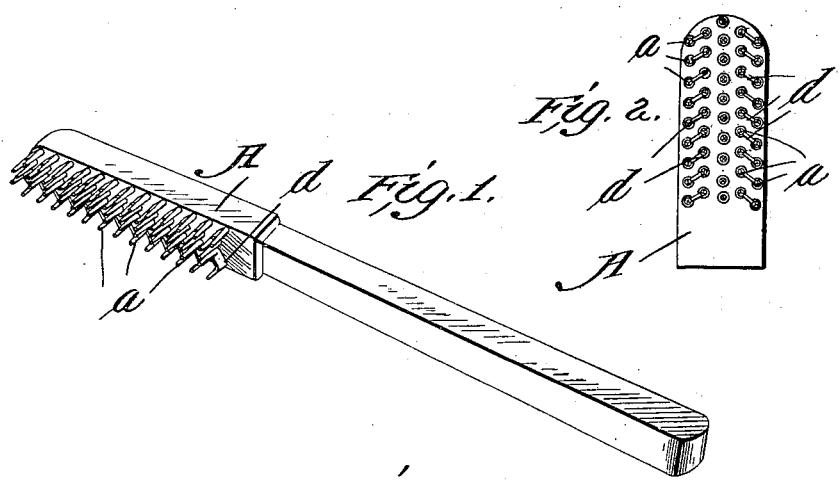
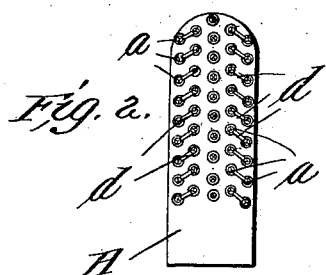
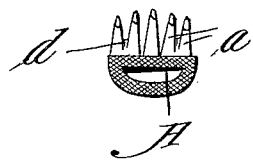
Attest  
Geo. F. Hall,  
Edw. L. Reed.
Inventor  
Charles W. Richards  
by Spear & Seely,  
Attys.

UNITED STATES PATENT OFFICE.

CHARLES W. RICHARDS, OF SAN FRANCISCO, CALIFORNIA.

TOOTH-BRUSH.

SPECIFICATION forming part of Letters Patent No. 659,593, dated October 9, 1900.

Application filed April 5, 1900. Serial No. 11,743. (No model.)

*To all whom it may concern:*

Be it known that I, CHARLES W. RICHARDS, a citizen of the United States, residing at San Francisco, in the county of San Francisco and State of California, have invented certain new and useful Improvements in Tooth-Brushes, of which the following is a specification.

My invention relates to tooth-brushes of the class in which soft-rubber cleansing-points project from a brush-head, the whole being usually formed integral.

The object of the present invention is to prevent the cleansing-points from flattening and spreading out laterally to an undue extent while in use by somewhat restraining their flexibility on lines approximately transverse. I do this by connecting adjacent cleansing-points by integrally-formed webs of soft rubber.

My invention is illustrated in the accompanying drawings, in which—

Figure 1 shows a brush in accordance with my invention in perspective. Fig. 2 is a detail elevation of the brush-head, and Fig. 3 a cross-sectional view of the same.

The brush shown herein comprises a head A, preferably of rubber, adapted to receive a handle b, and from the flat face c of the head the cleansing-points a project. The latter, as shown in Fig. 2, are preferably arranged in rows curved transversely of the brush. In order to preserve the requisite flexibility of the cleansing-points in the direction of the usual motion in cleansing the teeth and at the same time prevent their flexibility from allowing them to spread or flatten out too much laterally, the points in the outer adjacent rows are connected by integral webs d. As five rows of points are provided, the points of the middle row are left perfectly free and completely flexible; but the adjacent points in the two rows on each side of the middle one are connected transversely by these webs, which restrains their tendency to spread without impairing their flexibility in the direction of usual motion. As the points of the outer rows are arranged out of transverse alinement with the points of the adjacent rows, the webs d extend in oblique lines, as shown, the brush-head being molded from soft rubber and with its integral points forms a homogeneous structure which is practically indestructible.

I prefer to employ in brushes constructed according to my present invention cleansing-point of a shape like the separately-affixed cleansing-points shown in my Patent No. 628,185, granted July 4, 1899—that is, teeth having a slightly-tapering form of round cross-section, terminating in a pyramidal point of polygonal cross-section.

Having thus fully described my invention, what I claim as new, and desire to secure by Letters Patent, is—

1. A tooth-brush comprising a soft-rubber brush-head having integrally-formed cleansing-points, and integral webs of soft rubber connecting adjacent cleansing-points on substantially-transverse lines, substantially as and for the purpose set forth.

2. A tooth-brush comprising a soft-rubber brush-head, having rows of integrally-formed cleansing-points, the adjacent members of the outside adjacent rows being connected in pairs and transversely by integral webs of soft rubber.

In testimony whereof I have affixed my signature, in presence of two witnesses, this 19th day of March, 1900.

CHARLES W. RICHARDS.

Witnesses:
J. H. MILLER,
H. D. PILLSBURY.